United States Patent
Parker et al.

(10) Patent No.: US 11,220,468 B2
(45) Date of Patent: Jan. 11, 2022

(54) FERTILIZER COATING FOR DUST CONTROL AND/OR ANTI-CAKING

(71) Applicant: Arr-Maz Products, L.P., Mulberry, FL (US)

(72) Inventors: D. Todd Parker, Lakeland, FL (US); Mark Ogzewalla, Winter Haven, FL (US); Zachary T. Burrell, Mulberry, FL (US)

(73) Assignee: Arr-Maz Products. L.P., Mulberry, FL (US)

( * ) Notice: Subject to any disclaimer, the term of this patent is extended or adjusted under 35 U.S.C. 154(b) by 123 days.

(21) Appl. No.: 16/126,334

(22) Filed: Sep. 10, 2018

(65) Prior Publication Data
US 2019/0077723 A1    Mar. 14, 2019

Related U.S. Application Data

(60) Provisional application No. 62/556,810, filed on Sep. 11, 2017.

(51) Int. Cl.
*C05G 5/30* (2020.01)
*C05B 17/00* (2006.01)
*C05B 7/00* (2006.01)

(52) U.S. Cl.
CPC .............. *C05G 5/30* (2020.02); *C05B 7/00* (2013.01); *C05B 17/00* (2013.01); *C05G 5/38* (2020.02)

(58) Field of Classification Search
CPC .... C05G 5/30; C05G 5/38; C05B 7/00; C05B 17/00
See application file for complete search history.

(56) References Cited

U.S. PATENT DOCUMENTS

| | | | | |
|---|---|---|---|---|
| 2,829,040 A | * | 4/1958 | Darin | C05G 5/40 71/25 |
| 3,164,925 A | * | 1/1965 | Harshman | C08L 95/005 47/9 |
| 3,252,786 A | * | 5/1966 | Bozzelli | C05B 1/04 71/64.07 |
| 3,276,857 A | | 10/1966 | Stansbury et al. | |
| 3,300,293 A | | 1/1967 | Bozzelli et al. | |

(Continued)

FOREIGN PATENT DOCUMENTS

| | | | | |
|---|---|---|---|---|
| CA | 2948726 A1 | * | 5/2017 | C10L 1/04 |
| CN | 101560330 | | 11/2010 | |

(Continued)

OTHER PUBLICATIONS

Machine Translation of CN-103351214-A (Description section only) (Year Accessed: 2020) (Year: 2020).*

(Continued)

*Primary Examiner* — Jennifer A Smith
(74) *Attorney, Agent, or Firm* — Head, Johnson, Kachigian & Wilkinson, PC (57) ABSTRACT

A method of reducing dust formation and/or caking in fertilizer or other particulates. The method comprises coating the fertilizer or other particulate in a coating comprising vacuum tower asphalt extender (VTAE). The VTAE may be a non-distilled fraction of vacuum distillation of used automotive and/or industrial oil. The VTAE may not be asphalt or bitumen, although the coating may further comprise bitumen.

5 Claims, 8 Drawing Sheets

(56) References Cited

U.S. PATENT DOCUMENTS

| | | | |
|---|---|---|---|
| 4,101,414 A | 7/1978 | Kim et al. | |
| 6,074,469 A | 6/2000 | Collins et al. | |
| 6,355,083 B1 | 3/2002 | Ogzewalla | |
| 6,514,331 B2 | 2/2003 | Varnadoe et al. | |
| 6,776,832 B2 | 8/2004 | Spence et al. | |
| 8,741,021 B2 | 6/2014 | Ogle et al. | |
| 2002/0148388 A1* | 10/2002 | Varnadoe | C09D 195/00 106/278 |
| 2006/0040049 A1 | 2/2006 | Spence | |
| 2006/0252646 A1 | 11/2006 | Spence | |
| 2012/0272700 A1* | 11/2012 | Nevin | C05F 3/00 71/12 |
| 2013/0261232 A1 | 10/2013 | Barnat et al. | |
| 2017/0137717 A1* | 5/2017 | Palmer | C04B 26/26 |
| 2017/0204019 A1 | 7/2017 | Ogzewalla | |

FOREIGN PATENT DOCUMENTS

| | | | |
|---|---|---|---|
| CN | 102585889 | | 7/2012 |
| CN | 103351208 A | | 10/2013 |
| CN | 103351214 A | * | 10/2013 |
| CN | 106083492 A | * | 11/2016 |
| EP | 1847587 | | 4/2006 |
| JP | 2007051284 | | 3/2007 |
| KR | 1019990077527 | | 10/1999 |
| KR | 101410859 | | 7/2014 |

OTHER PUBLICATIONS

Machine Translation of CN-106083492-A (Description section only) (Year Accessed: 2020) (Year: 2020).*

Recycling Product News, "Used Oil Recycling: Good for the Environment, Good for Business", May 28, 2017, accessed from https://www.recyclingproductnews.com/article/25604/used-oil-recycling-good-for-the-environment-good-for-business (Year: 2017).*

International Search Report and Written Opinion from Corresponding PCT Patent Application PCT/US2018/050333 dated Mar. 21, 2019; Korean Intellectual Property Office.

Extended European Search Report from Corresponding European Patent Application No. 18853016.6 dated Jun. 16, 2021; European Patent Office.

Database WPI Week 201411 Thomson Scientific, London, GB; AN 2014-A03361.

* cited by examiner

FERTILIZER COATING FOR DUST CONTROL AND/OR ANTI-CAKING

CROSS REFERENCE

This application is based on and claims priority to U.S. Provisional Patent Application No. 62/556,810 filed Sep. 11, 2017.

BACKGROUND OF THE INVENTION

Field of the Invention

This invention relates generally to coating compositions and more particularly, but not by way of limitation, to vacuum tower asphalt extender for dust control and/or anticaking of fertilizer during storage and transportation.

Description of the Related Art

The storage and handling of bulk materials present unique problems relating to both dust formation and cake formation. Specifically, dust formation poses safety, health, and environmental problems, while cake formation makes storing and handling of bulk materials difficult and, in extreme cases, caked material can create safety hazards.

These issues are particularly problematic in the fertilizer industry. Fertilizers are generally in powder, crystalline, or granular form and have a tendency to generate dust during manufacture, storage, and transportation. Dust may be formed due to abrasion encountered during movement of the fertilizer particles, continued chemical reactions, or curing processes after the initial particle formation, which raises health concerns for human and animal inhalation when the dust becomes airborne. Fertilizer particles also have a tendency to cake or agglomerate into larger lumps due to changes in humidity and/or temperature or other environmental conditions. Cake formation causes a problem prior to the application of the fertilizer because the fertilizer must be broken up to provide a material that is suitable for even distribution in the field and to prevent clogging of distribution machinery.

Various approaches have been developed to overcome the problems associated with fertilizer caking and dusting, some with a measure of success. For example, using oil, waxes, and blends of oil and wax have been known for a long time. These oils and waxes can be petroleum or vegetable based. However, there are disadvantages when using these treatment methods. Over time, oil tends to volatilize and/or be absorbed into the fertilizer particles and lose their effectiveness. Waxes are also ineffective and difficult to handle because they are absorbed into the fertilizer particles when they are at a temperature above their melting point, but they do not spread or coat the surface of fertilizer particles when they are applied at a temperature below their melting point. In addition, both oil and waxes have limited binding properties, which are essential for long term fertilizer dust control and anti-caking abilities.

In the related U.S. patent application Ser. No. 15/404,348, which is incorporated herein by reference, we found that bitumen may be used in a fertilizer coating to reduce the generation of dust and reduce the tendency to cake during long term storage and handling conditions.

Vacuum tower asphalt extender (VTAE) is produced by re-refining automotive and/or industrial oils. VTAE is sometimes referred to as heavy vacuum tower bottoms, re-refined heavy vacuum tower bottoms, re-refined engine oil, re-refined engine oil bottoms (REOB), re-refined motor oil, waste engine oil, flux, asphalt flux, asphalt blowdown, engine oil residue, re-refined heavy vacuum distillation bottoms, re-refined heavy vacuum distillation oil, re-refined vacuum tower bottoms, vacuum tower bottom, vacuum tower asphalt binder, waste engine oil residue, or waste oil distillation bottoms. VTAE is not asphalt, but is often mixed with asphalt for paving, roofing, or industrial uses. VTAE can be used to modify the viscosity of asphalt, which is particularly useful in reducing cracking and in recycling asphalt pavement. When VTAE used with asphalt, it is usually used in small quantities, typically making up less than 1% by weight of the total mix.

There is a common misperception that VTAE is asphalt, but this is not correct. VTAE is derived differently than asphalt and has a different composition. For example, according to a presentation titled "VTAE Oils in Asphalt" dated Oct. 23, 2014 by PRI Asphalt Technologies, Inc. and Safety-Kleen, Clean Harbor Inc., VTAE from one source was comprised of 5.7% ash, 0% water, 2.6% asphaltenes, 44.7% polar aromatics, 0% naphthene aromatics, 52.7% saturates, and 0.28% wax, with a solubility of 99.3%. VTAE from a second source was comprised of 8.8% ash, 0% water, 6.6% asphaltenes, 51.9% polar aromatics, 0% naphthene aromatics, 41.5% saturates, and 0.1% wax, with a solubility of 98.7%. VTAE may have a specific gravity at 15.6 C of 0.920-0.975, an RTFOT mass change of −0.16-0.45%, a TFOT mass change of −0.13-0.40%, a flash point of at least 550 F, a rotational viscosity at 135 C of no more than 300 cps, and an absolute viscosity at 60 C of 1,500 to 5,000 P. Please note that the composition and characteristics of VTAE may vary broadly, and these values are provided as examples only.

Asphalt, on the other hand, typically contains approximately 83% carbon, 10% hydrogen, 7% oxygen, nitrogen, and sulphur, and trace amounts of vanadium, nickel, aluminum, and silicon. When separated by a solvent, asphalt can be broken down into four groups of constituents: asphaltenes, resins, aromatic oils, and saturated oils. Asphaltenes are typically the largest component by weight, followed by resins and then the two oils.

Asphalt is derived from vacuum tower bottoms. Typically, crude oil is subjected to a distillation process that produces numerous products, including vacuum tower bottoms. Those vacuum tower bottoms are then subjected to further processing to produce asphalt.

Other products of processed vacuum tower bottoms include lubricating oils and greases. Additives may be used to make such products suitable for use as engine oil for automotive or industrial use. When the additives wear out, the oil must be changed, but the underlying base oils remain mostly unchanged. Thus, such used oil may be recovered and re-refined to refine the base oils.

Recovered oils may be subjected to dehydration and fuel stripping, which separates out industrial fuels. What remains may be subjected to vacuum distillation to produce vacuum gas oil for use as marine fuel, or the product of the vacuum distillation may be hydrotreated to produce re-refined oil base stocks for lubricant production. The bottoms from that vacuum distillation process are VTAE. To state it more succinctly, as defined in a presentation titled "Introduction to Re-Refined Vacuum Tower Asphalt Extenders (VTAEs)" presented to OHMPA Road Show in April/May 2015 by Safety-Kleen, VTAE is "the non-distilled fraction from the vacuum tower of re-refined lubricating oils."

Based on the foregoing, it is desirable to provide a coating formulation for fertilizer to reduce the generation of dust and reduce the tendency to cake during the long term storage and handling conditions encountered by commercial fertilizer products.

It is further desirable for the coating to provide comparable dust control and/or improved caking resistance compared to bitumen.

It is further desirable that the coating formulation does not affect the handling characteristics, flowability, or agronomic properties of the fertilizer.

SUMMARY OF THE INVENTION

In general, in a first aspect, the invention relates to a fertilizer composite comprising simple or complex fertilizer and a coating at least partially covering the fertilizer, the coating comprising vacuum tower asphalt extender (VTAE). The VTAE may be a non-distilled fraction of vacuum distillation of used automotive and/or industrial oil. The VTAE may not be bitumen or asphalt.

The coating may further comprise bitumen and/or asphalt. The bitumen may be bitumen, cutback bitumen, or a combination of bitumen and cutback bitumen; the asphalt may be asphalt, cutback asphalt, or a combination of asphalt and cutback asphalt; and the VTAE may be VTAE, cutback VTAE, or a combination of VTAE and cutback VTAE. The bitumen, cutback bitumen, or combination of bitumen and cutback bitumen and/or asphalt, cutback asphalt, or combination of asphalt and cutback asphalt may be emulsified with water. Additionally or alternately, the VTAE, cutback VTAE, or combination of VTAE and cutback VTAE may be emulsified with water. Additionally or alternately, the combination of VTAE, cutback VTAE, or combination of VTAE and cutback VTAE and bitumen, cutback bitumen, or combination of bitumen and cutback bitumen and/or asphalt, cutback asphalt, or combination of asphalt and cutback asphalt may be emulsified with water.

The fertilizer may be a plant nutrient selected from the group consisting of compounds of primary macronutrients (Nitrogen, Phosphorous, and Potassium), secondary macronutrients (Calcium, Sulfur, and Magnesium), and micronutrients (Boron, Chlorine, Copper, Iron, Magnesium, Molybdenum, and Zinc), or combinations thereof. The fertilizer may be granular, crushed, compacted, crystalline, agglomerated, or prilled fertilizer or a combination thereof.

In a second aspect, the invention relates to a method of preventing dust formation and/or caking, the method comprising at least partially coating a particulate with a coating, the coating comprising vacuum tower asphalt extender (VTAE). Again, the VTAE may be a non-distilled fraction of vacuum distillation of used automotive and/or industrial oil, and may not be bitumen or asphalt.

The coating may further comprise bitumen and/or asphalt. The bitumen may be bitumen, cutback bitumen, or a combination of bitumen and cutback bitumen; the asphalt may be asphalt, cutback asphalt, or a combination of asphalt and cutback asphalt; and the VTAE may be VTAE, cutback VTAE, or a combination of VTAE and cutback VTAE. The method may further comprise emulsifying the VTAE, cutback VTAE, or combination of VTAE; bitumen, cutback bitumen, or combination of bitumen and cutback bitumen and/or asphalt, cutback asphalt, or combination of asphalt and cutback asphalt; combination of VTAE and bitumen, cutback bitumen, or combination of bitumen and cutback bitumen and/or asphalt, cutback asphalt, or combination of asphalt and cutback asphalt; or any combination thereof prior to at least partially coating the particulate.

The particulate may be fertilizer, namely a plant nutrient selected from the group consisting of compounds of primary macronutrients (Nitrogen, Phosphorous, and Potassium), secondary macronutrients (Calcium, Sulfur, and Magnesium), and micronutrients (Boron, Chlorine, Copper, Iron, Magnesium, Molybdenum, and Zinc), or combinations thereof. The fertilizer may be granular, crushed, compacted, crystalline, agglomerated, or prilled fertilizer or a combination thereof.

In a third aspect, the invention relates to a coating comprising vacuum tower asphalt extender (VTAE). The coating may be a dust control and/or anti-caking coating. Again, the VTAE may be a non-distilled fraction of vacuum distillation of used automotive and/or industrial oil and may not be bitumen or asphalt. The coating may further comprise bitumen and/or asphalt. The bitumen may be bitumen, cutback bitumen, or a combination of bitumen and cutback bitumen; the asphalt may be asphalt, cutback asphalt, or a combination of asphalt and cutback asphalt; and the VTAE may be VTAE, cutback VTAE, or a combination of VTAE and cutback VTAE. The bitumen, cutback bitumen, or combination of bitumen and cutback bitumen and/or asphalt, cutback asphalt, or combination of asphalt and cutback asphalt may be emulsified with water. Additionally or alternately, the VTAE, cutback VTAE, or combination of VTAE and cutback VTAE may be emulsified with water. Additionally or alternately, the combination of VTAE, cutback VTAE, or combination of VTAE and cutback VTAE and bitumen, cutback bitumen, or combination of bitumen and cutback bitumen and/or asphalt, cutback asphalt, or combination of asphalt and cutback asphalt may be emulsified with water.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a coating composition comprising vacuum tower asphalt extender (VTAE). The composition may be used as a coating for fertilizer or other particles, such as silica dust, respirable dust, etc. The coating may control ambient dust levels, reduce dust formation, and/or reduce caking tendencies without affecting the handling characteristics of the fertilizer or other particles.

The VTAE may be derived from refined automotive and/or industrial oils.

Specifically, the VTAE may be the non-distilled fraction from the vacuum tower of re-refined automotive and/or industrial oils. The VTAE may be made by recovering used oil, subjecting the recovered oil to dehydration and fuel stripping to remove fuels for industrial use, subjecting what remains to vacuum distillation, and collecting the bottoms of the vacuum distillation as VTAE. The VTAE may not be asphalt or bitumen.

The coating composition may additionally comprise bitumen, asphalt, diluent, and/or other constituents in addition to VTAE. The VTAE may be emulsified with water prior to use. If the coating composition additionally comprises bitumen, the VTAE may be emulsified prior to combining it with bitumen and/or asphalt; the bitumen and/or asphalt may be emulsified prior to combining it with VTAE; the coating may be emulsified after the VTAE and bitumen and/or asphalt are combined; or any combination thereof. The bitumen may be bitumen, cutback bitumen, or a combination thereof; the asphalt may be asphalt, cutback asphalt, or a combination thereof; and the VTAE may be VTAE, cutback VTAE, or a combination thereof. Cutters useful for compounding with the VTAE include, but are not limited to, white oil, refined mineral oils, and vegetable oils such as corn oil, canola oil, cottonseed oil, sunflower oil, soy oil, linseed oil, castor oil, and tall oil. Oils having moderate viscosity, low volatility, and high flash point may be preferred.

The coating composition may be used to coat inorganic or organic fertilizers. The fertilizer may be a plant nutrient selected from the group consisting of compounds of primary macronutrients (Nitrogen, Phosphorous, and Potassium), secondary macronutrients (Calcium, Sulfur, and Magnesium), micronutrients (Boron, Chlorine, Copper, Iron, Magnesium, Molybdenum, and Zinc), or combinations thereof, or may be any other desired fertilizer. The fertilizer may be in granular, pelletized, crushed, compacted, crystalline, agglomerated, or prilled form. The coating composition may not interfere with the fertilizer grade, the product quality, or the rate of release of the fertilizer. The coating composition may be applied to the fertilizer through spraying or through other desired techniques.

Fertilizers coated with this emulsified coating may generate less dust that those coated with current commercial products. In addition, fertilizers coated with this coating may cake less than those coated with current commercial products. This reduction in caking tendency was unexpected.

The invention can be further explained by reference to the below-described examples.

EXAMPLES

During testing, fertilizer was heated to 60 C (140 F) prior to coating. The coating agents were around 85 C (185 F) at the time of application. The coating agents were applied at dosage rates of 4 lbs./ton and 8 lbs./ton. After application, the coated fertilizer was allowed to cool to room temperature before running caking tests and dust control tests.

Dust levels were determined by using a dust tower described in U.S. Pat. No. 6,062,094 to Carlini et al. In this test, the fertilizer particles are passed through a counter current air stream and are agitated at the same time by passing through a series of grates. The dust particles are collected on a filter and the dust levels determined by measuring the changes in weight on an analytical balance. This test is believed to be accurate to within +/−50 ppm. Dust level were determined both initially after treatment with the coating formulations and again after aging for four weeks. This aging process is used to simulate the increase in dust levels normally encountered during the storage of fertilizers.

Caking levels were determined by using a compaction instrument to evaluate the strength required for breaking the caked fertilizer. In this test, the fertilizer particles were placed into the conditioning chamber where controlled temperature, humidity, and pressure conditions were used to induce caking. In particular, the fertilizer coated at a rate of 8 lbs./ton was exposed either 75% relative humidity at 35 C or 65% relative humidity at 30 C under 5 pressure for 19 hours. Caking test cells were then cooled to room temperature for an additional three hours before measurements were taken. The caked fertilizer particles were placed under a probe attached to a digital force gauge. The probe was lowered at a controlled rate into the fertilizer granules to a depth of ½ inch. The force required to break up the caked fertilizer was recorded from the force gauge and is a measurement of the extent of caking. Uncoated fertilizer was tested using the same procedure and conditions as a control.

The Examples below demonstrate improved dust control of fertilizer coated with VTAE or a coating comprising VTAE and bitumen compared to uncoated fertilizer, and comparable levels of dust control when compared to fertilizer coated in bitumen without VTAE. The Examples also demonstrate improved caking resistance of fertilizer coated with VTAE compared to both uncoated fertilizer and fertilizer coated with a bituminous coating without VTAE. Thus, coatings containing VTAE may offer increased resistance to caking without losing the dust control benefits of a bituminous coating.

Example 1

Five types of VTAE coatings, designated VTAE #1 through VTAE #5, were tested for dust control on nitrogen phosphorus sulfur (NPS) fertilizer. VTAE #1 and VTAE #2 are two types of VTAE alone, while VTAE #3, #4, and #5 are combinations of VTAE #1 and bituminous dust control agents. Uncoated fertilizer, two types of bituminous dust control agents without VTAE, designated DCA #1 through DCA #3, and two bituminous blends, designated Blend #1 and Blend #2, also without VTAE, were also tested for comparison. Such bituminous coatings are discussed in the related U.S. patent application Ser. No. 15/404,348 ("the '348 Application").

In the first dust test, uncoated NPS fertilizer had an initial dust level of 325 and a four week total of 455. The three types of dust control agents were tested at coating rates of both 4 lbs. and 8 lbs. and were each compared to a VTAE coating with a similar viscosity, also applied at 4 lbs. and 8 lbs. The results are shown in Table 1 and FIGS. 1, 2, and 3.

TABLE 1

Figure 1:
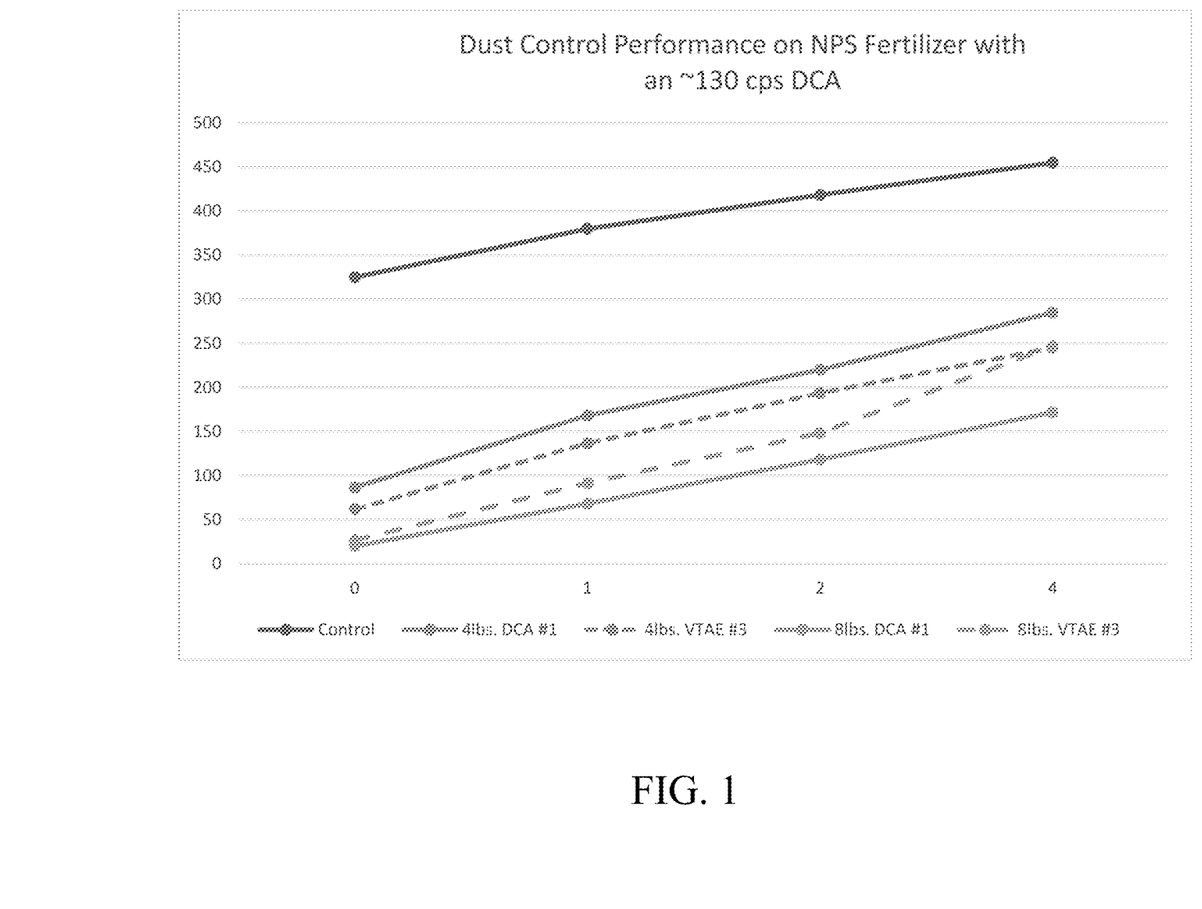
FIG. 1 is a chart dust control performance on NPS fertilizer with an approximately 130 cps DCA.
Figure 2:
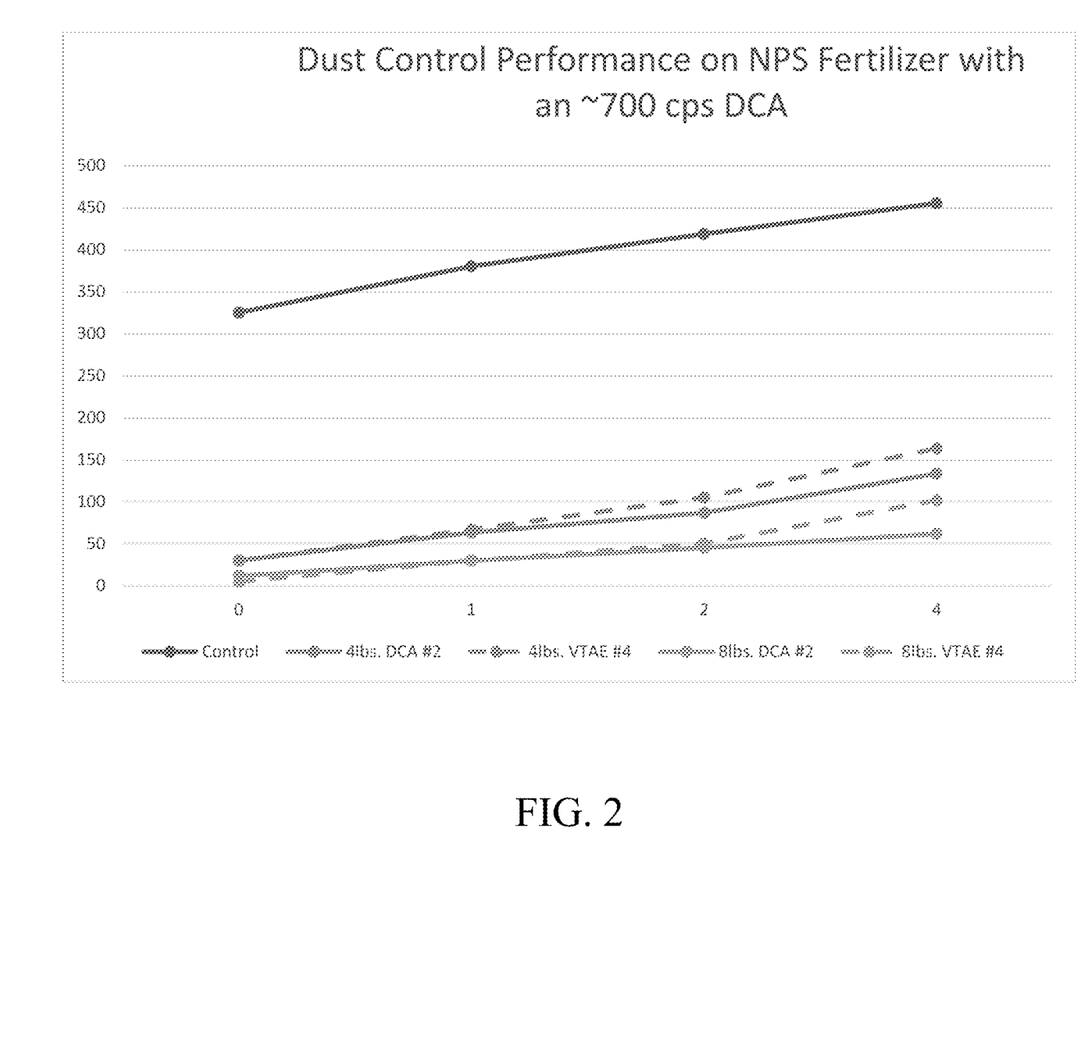
FIG. 2 is a chart showing dust control performance on NPS fertilizer with an approximately 700 cps DCA.
Figure 3:
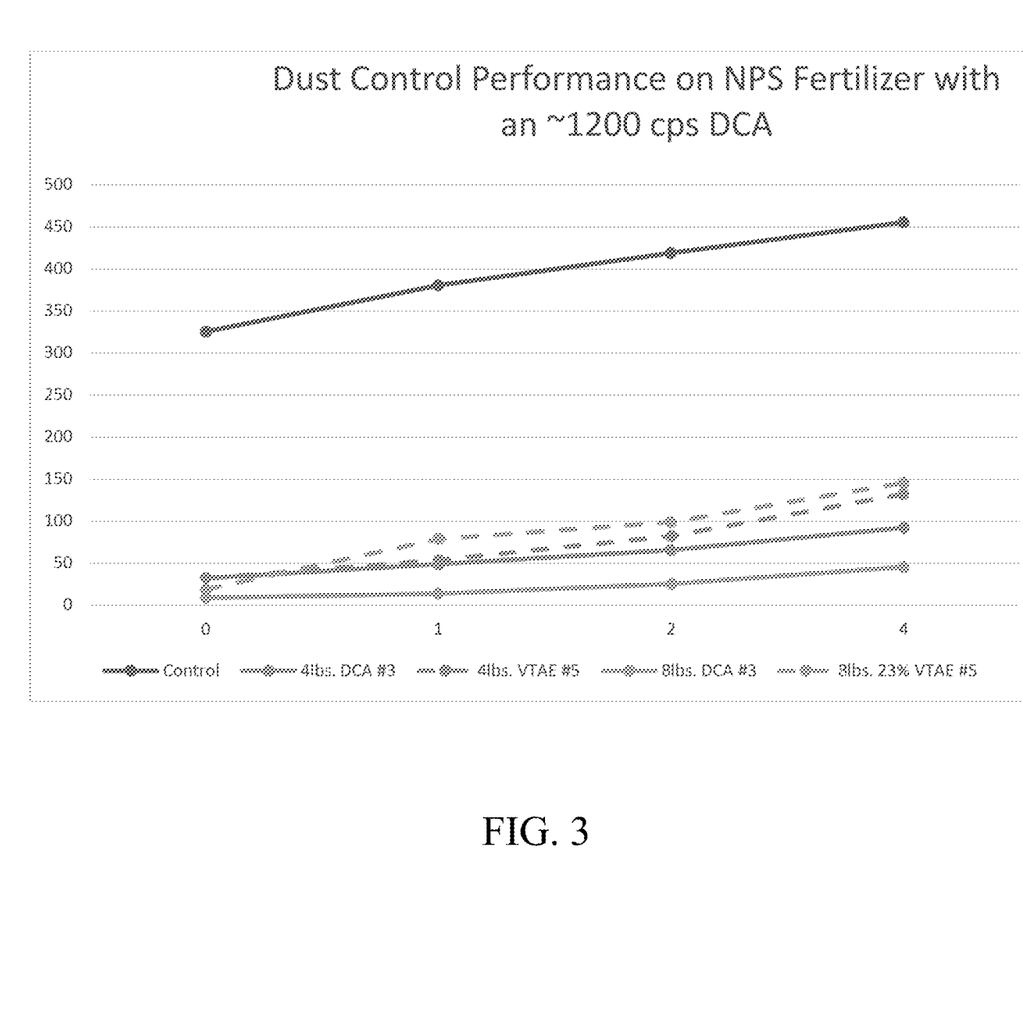
FIG. 3 is a chart showing dust control performance on NPS fertilizer with an approximately 1200 cps DCA.

| Coating Agent/Dose | Viscosity of Coating (cps, 140 F.) | Initial (ppm) | 1 Week (ppm) | 2 Weeks (ppm) | 4 Weeks (ppm) | Totals (ppm) |
|---|---|---|---|---|---|---|
| Control | | 325 | 55 | 38 | 37 | 455 |
| 4 lbs. DCA #1 | 135 | 87 | 82 | 52 | 65 | 285 |
| 8 lbs. DCA #1 | 135 | 20 | 48 | 50 | 53 | 172 |
| 4 lbs. VTAE #3 | 130 | 62 | 75 | 57 | 52 | 245 |
| 8 lbs. VTAE #3 | 130 | 27 | 65 | 57 | 98 | 247 |
| 4 lbs. DCA #2 | 700 | 30 | 33 | 23 | 47 | 133 |
| 8 lbs. DCA #2 | 700 | 12 | 18 | 15 | 17 | 62 |
| 4 lbs. VTAE #4 | 702 | 30 | 37 | 38 | 58 | 163 |
| 8 lbs. VTAE #4 | 702 | 5 | 25 | 20 | 52 | 102 |
| 4 lbs. DCA #3 | 1250 | 32 | 17 | 17 | 27 | 92 |
| 8 lbs. DCA #3 | 1250 | 8 | 5 | 12 | 20 | 45 |
| 4 lbs. VTAE #5 | 1207 | 32 | 22 | 28 | 50 | 132 |
| 8 lbs. VTAE #5 | 1207 | 18 | 60 | 20 | 47 | 145 |

As shown in Table 1, all three VTAE coatings tested showed significant improvement in dust levels both initially and in total compared to uncoated fertilizer. In particular, VTAE #3 had a four week total of 245 at a 4 lbs. coating rate and 247 at an 8 lbs. coating rate; VTAE #4 had a four week total of 163 at a 4 lbs. coating rate and 102 at an 8 lbs. coating rate; and VTAE #5 had a four week total of 132 at a 4 lbs. coating rate and 145 at an 8 lbs. coating rate. All were much lower than the four week total of 455 of the uncoated fertilizer. The VTAE coatings also showed similar dust control compared to the bituminous dust control agents tested with a similar viscosity, which were shown in the '348 Application to provide improved dust control compared to other commercial coatings.

In the second dust test, uncoated NPS fertilizer had an initial dust level of 197 and a four week total of 442. Two types of VTAE were tested at coating rates of both 4 lbs. and 8 lbs., along with a blend with a similar viscosity, also applied at 4 lbs. and 8 lbs. The results are shown in Table 2 and FIGS. 4 and 5.

TABLE 2

Figure 4:
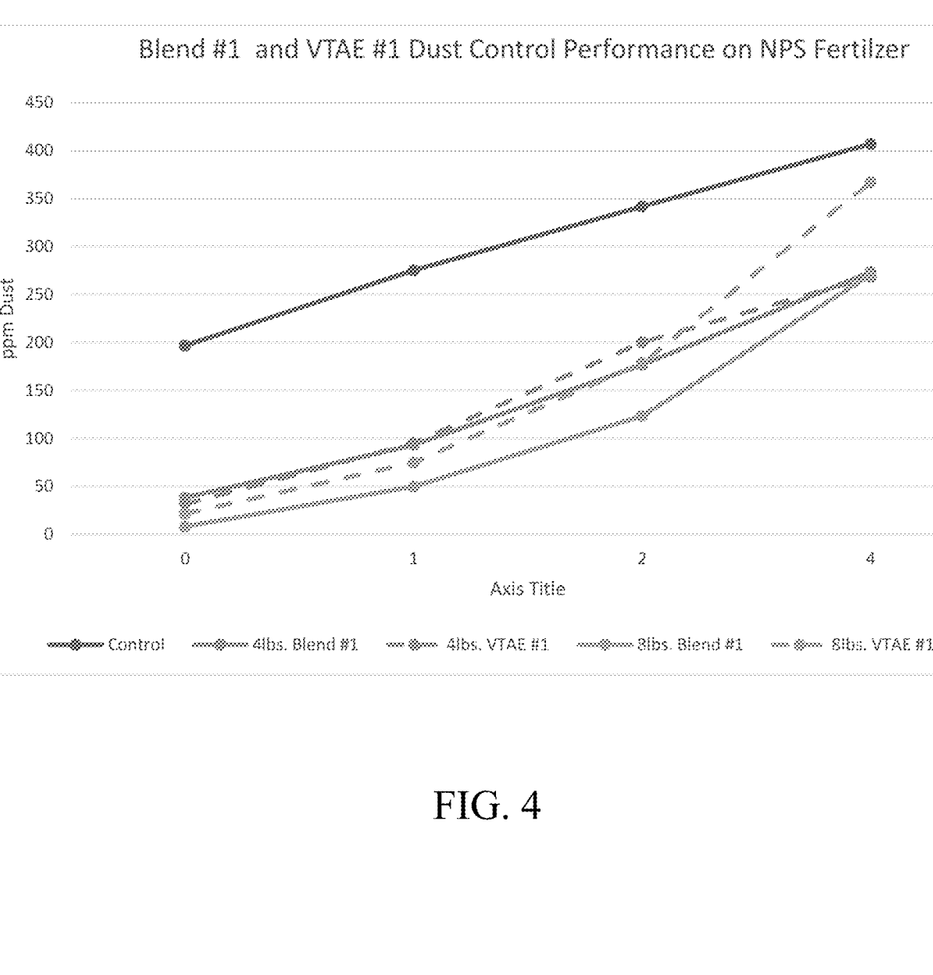
FIG. 4 is a chart showing dust control performance of Blend #1 and VTAE #1.
Figure 5:
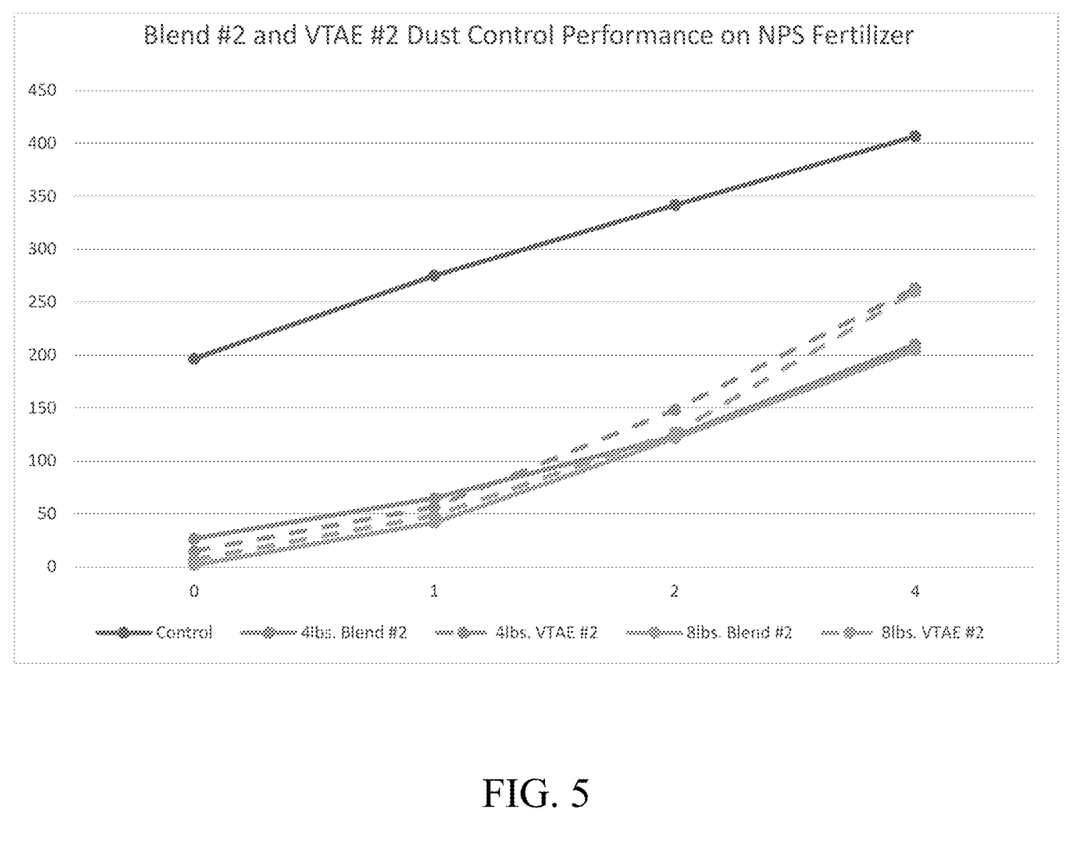
FIG. 5 is a chart showing dust control performance of Blend #2 and VTAE #2.

| Coating Agent/Dose | Viscosity of Coating (cps, 140 F.) | Initial (ppm) | 1 Week (ppm) | 2 Weeks (ppm) | 4 Weeks (ppm) | Totals (ppm) |
|---|---|---|---|---|---|---|
| Control | | 197 | 78 | 67 | 65 | 407 |
| 4 lbs. VTAE #1 | 590 | 32 | 63 | 105 | 68 | 268 |
| 8 lbs. VTAE #1 | 590 | 22 | 53 | 103 | 188 | 367 |
| 4 lbs. Blend #1 | 612 | 38 | 55 | 83 | 97 | 273 |
| 8 lbs. Blend #1 | 612 | 8 | 42 | 73 | 147 | 270 |
| 4 lbs. VTAE #2 | 1602 | 15 | 42 | 92 | 115 | 263 |
| 8 lbs. VTAE #2 | 1602 | 7 | 42 | 78 | 133 | 260 |
| 4 lbs. Blend #2 | 1620 | 27 | 38 | 58 | 87 | 210 |
| 8 lbs. Blend #2 | 1620 | 2 | 40 | 80 | 83 | 205 |

As shown in Table 2, both VTAE coatings showed significant improvement in both initial and total dust levels compared to the uncoated NPS fertilizer. In particular, the totals ranged from 260 to 367, compared to 407 for the uncoated fertilizer. This was true of both 4 lbs. and 8 lbs. coating rates and a range of viscosities. In addition, the VTAE coatings also showed similar dust control compared to the bituminous blends tested with a similar viscosity, which were shown in the '348 Application to provide improved dust control compared to other commercial coatings.

Example 2

Two types of VTAE coatings, designated VTAE #1 and VTAE #2, and two bituminous blends, designated Blend #1 and Blend #2, were tested for caking strength on three types of fertilizer. VTAE #1, VTAE #2, Blend #1, and Blend #2 are all the same as those used in Example 1 above. Uncoated fertilizer was also tested for comparison.

Uncoated DAP was tested three times, and showed an average caking strength of 31.423. The two types of VTAE, as well as the two types of blends with similar viscosities, were similarly tested three times and their averages compared to the caking strength of uncoated DAP. The results are shown in Table 3, with the percent improvement in caking resistance compared to uncoated DAP shown in FIG. 6.

TABLE 3

DAP; 8 lbs./ton; 35° C.; 75% RH

Figure 6:
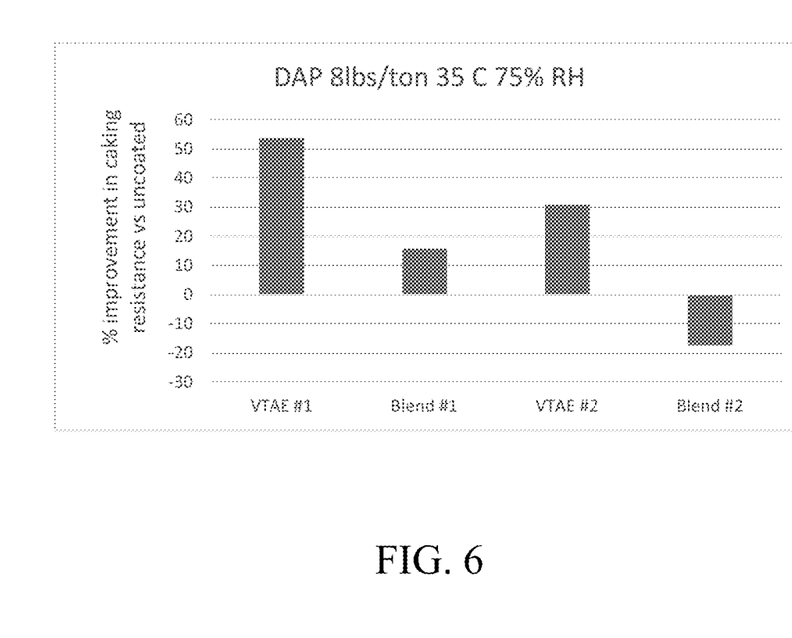
FIG. 6 is a chart showing improvement in caking resistance of coated DAP compared to uncoated DAP.

| Sample | Viscosity of Coating (cps, 140 F.) | Replicate 1 (lbs.) | Replicate 2 (lbs.) | Replicate 3 (lbs.) | Averages (lbs.) |
|---|---|---|---|---|---|
| Control | n/a | 26.64 | 34.06 | 33.57 | 31.42 |
| VTAE #1 | 590 | 20.35 | 12.57 | 10.63 | 14.52 |
| Blend #1 | 612 | 23.62 | 32.93 | 22.78 | 26.45 |

TABLE 3-continued

DAP; 8 lbs./ton; 35° C.; 75% RH

| Sample | Viscosity of Coating (cps, 140 F.) | Replicate 1 (lbs.) | Replicate 2 (lbs.) | Replicate 3 (lbs.) | Averages (lbs.) |
|---|---|---|---|---|---|
| VTAE #2 | 1600 | 26.52 | 19.51 | 19.21 | 21.75 |
| Blend #2 | 1620 | 51.49 | 36.53 | 22.62 | 36.88 |

As shown in Table 3, VTAE #1 had an average caking strength of 14.52, for an improvement over uncoated DAP of 54%. VTAE #2 had an average caking strength of 21.75, for an improvement over uncoated DAP of 22%. Blend #1, on the other hand, showed an average improvement of 16%.

Uncoated NPS fertilizer was similarly tested three times, and showed an average caking strength of 16.467. VTAE #1 and Blend #1 with a similar viscosity were similarly tested three times and their averages compared to the caking strength of uncoated NPS fertilizer. The results are shown in Table 4, with the percent improvement in caking resistance compared to uncoated NPS fertilizer shown in FIG. 7.

TABLE 4

NPS fertilizer; 8 lbs./ton; 35° C.; 75% RH

Figure 7:
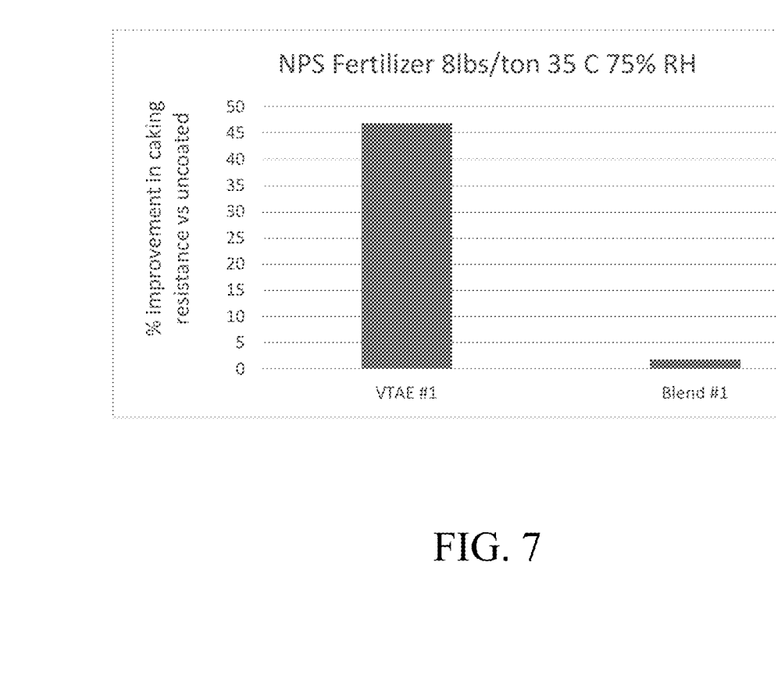
FIG. 7 is a chart showing improvement in caking resistance in coated NPS fertilizer compared to uncoated NPS fertilizer.

| Sample | Replicate 1 (lbs.) | Replicate 2 (lbs.) | Replicate 3 (lbs.) | Averages (lbs.) |
|---|---|---|---|---|
| Control | 19.68 | 15.46 | 14.25 | 16.47 |
| VTAE #1 | 7.368 | 5.892 | 12.98 | 8.75 |
| Blend #1 | 14.23 | 11.42 | 22.85 | 16.17 |

As shown in Table 4, VTAE #1 had an average caking strength of 16.47, for an improvement over uncoated NPS fertilizer of 47%.

Uncoated NPK was likewise tested three times, and showed an average caking strength of 30.51. VTAE #1 and Blend #1 with a similar viscosity were similarly tested three times and their averages compared to the caking strength of uncoated NPK. The results are shown in Table 5, with the percent improvement in caking resistance compared to uncoated NPK shown in FIG. 8.

TABLE 5

NPK; 8 lbs./ton; 30° C.; 65% RH

Figure 8:
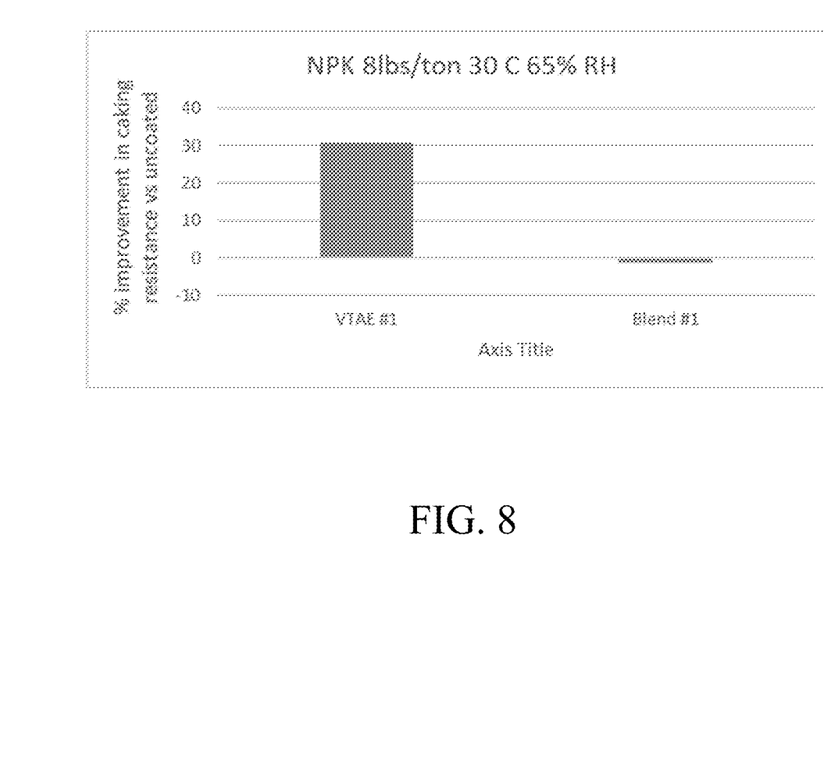
FIG. 8 is a chart showing improvement in caking resistance in coated NPK compared to uncoated NPK.

| Sample | Replicate 1 (lbs.) | Replicate 2 (lbs.) | Replicate 3 (lbs.) | Averages (lbs.) |
|---|---|---|---|---|
| Control | 30.05 | 34.49 | 26.99 | 30.51 |
| VTAE #1 | 20.98 | 17.85 | 24.57 | 21.14 |
| Blend #1 | 24.77 | 34.96 | 33.01 | 30.91 |

As shown in Table 5, VTAE #1 had an average caking strength of 21.14, for an improvement over uncoated NPK of 31%. By comparison, Blend #1 showed an average loss of 1%.

This set of tests demonstrates an improvement in caking strength of fertilizer coated with VTAE compared to uncoated fertilizer. It also shows an improvement in caking strength of fertilizer coated with VTAE compared to both blends.

Whereas, the devices and methods have been described in relation to the drawings and claims, it should be understood that other and further modifications, apart from those shown or suggested herein, may be made within the spirit and scope of this invention.

What is claimed is:

1. A method of preventing dust formation or caking, the method comprising:
at least partially coating a fertilizer particulate with a coating, the coating comprising vacuum tower asphalt extender (VTAE), where the VTAE is bottoms from a vacuum distillation process of used automotive and/or industrial oil and the VTAE has a rotational viscosity at 135 C of no more than 300 cps.

2. The method of claim 1 where the coating further comprises bitumen and/or asphalt.

3. The method of claim 2 where:
the bitumen is bitumen, cutback bitumen, or a combination of bitumen and cutback bitumen;
the asphalt is asphalt, cutback asphalt, or a combination of asphalt and cutback asphalt;
the VTAE is VTAE, cutback VTAE, or a combination of VTAE and cutback VTAE; or
any combination thereof,
the method further comprising emulsifying the VTAE, cutback VTAE, or combination of cutback VTAE; the bitumen, cutback bitumen, or combination of bitumen and cutback bitumen and/or the asphalt, cutback asphalt, or combination of asphalt and cutback asphalt; and/or the coating prior to at least partially coating the particulate.

4. The method of claim 1 where the fertilizer is a plant nutrient selected from the group consisting of compounds of primary macronutrients (Nitrogen, Phosphorous, and Potassium), secondary macronutrients (Calcium, Sulfur, and Magnesium), and micronutrients (Boron, Chlorine, Copper, Iron, Magnesium, Molybdenum, and Zinc), or combinations thereof.

5. The method of claim 1 where the fertilizer is granular, crushed, compacted, crystalline, agglomerated, or prilled fertilizer or a combination thereof.

* * * * *